(12) United States Patent
Liao et al.

(10) Patent No.: US 7,539,188 B2
(45) Date of Patent: *May 26, 2009

(54) ROBUST, INFERENTIALLY SYNCHRONIZED TRANSMISSION OF COMPRESSED TRANSPORT-LAYER-PROTOCOL HEADERS

(75) Inventors: HongBin Liao, Tianjin (CN); Qian Zhang, Beijing (CN); Wenwu Zhu, Basking Ridge, NJ (US); Ya-Qin Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/203,954

(22) Filed: Aug. 15, 2005

(65) Prior Publication Data

US 2005/0286523 A1 Dec. 29, 2005

Related U.S. Application Data

(62) Division of application No. 09/848,848, filed on May 3, 2001, now Pat. No. 7,046,672.

(60) Provisional application No. 60/249,712, filed on Nov. 16, 2000.

(51) Int. Cl.
*H04L 12/28* (2006.01)
(52) U.S. Cl. .................... 370/389; 370/395.52
(58) Field of Classification Search ............ 370/392, 370/474, 349, 389, 395.52
See application file for complete search history.

(56) References Cited

U.S. PATENT DOCUMENTS

| | | | |
|---|---|---|---|
| 5,535,199 A * | 7/1996 | Amri et al. ............... 370/392 |
| 5,974,028 A | 10/1999 | Ramakrishnan | |
| 5,987,022 A * | 11/1999 | Geiger et al. ............... 370/349 |
| 6,032,197 A | 2/2000 | Birdwell et al. | |
| 6,434,168 B1 | 8/2002 | Kari | |
| 6,574,742 B1 * | 6/2003 | Jamroga et al. ............. 713/400 |
| 6,608,841 B1 | 8/2003 | Koodli | |
| 6,609,224 B1 * | 8/2003 | Jonsson ....................... 714/758 |
| 6,754,231 B1 * | 6/2004 | Jonsson et al. .............. 370/474 |
| 6,804,238 B1 | 10/2004 | Euget et al. | |
| 6,882,637 B1 | 4/2005 | Le et al. | |
| 6,963,570 B1 | 11/2005 | Agarwal | |

* cited by examiner

*Primary Examiner*—Dang T Ton
*Assistant Examiner*—Mandish Randhawa
(74) *Attorney, Agent, or Firm*—Lee & Hayes, PLLC

(57) ABSTRACT

An implementation of a technology, described herein, for transmitting compressed network transport-layer-protocol headers in a speedy, efficient, inferentially synchronized, and robust manner. An implementation, described herein, models the transmission of compressed headers to the congestion procedure of the network transport-layer protocol (e.g., TCP's). Doing so, the sender of the compressed headers can infer whether the receiver correctly received them. Unlike the slow direct synchronization employed by conventional schemes, this implementation of the present claimed invention inferentially synchronizes by modeling after the congestion procedure of the network transport-layer protocol. This is inherently faster than direct synchronization. Since the implementation performs well over both noiseless and noisy links, it is particularly suited to use over wireless communications channels. This abstract itself is not intended to limit the scope of this patent. The scope of the present invention is pointed out in the appending claims.

11 Claims, 7 Drawing Sheets

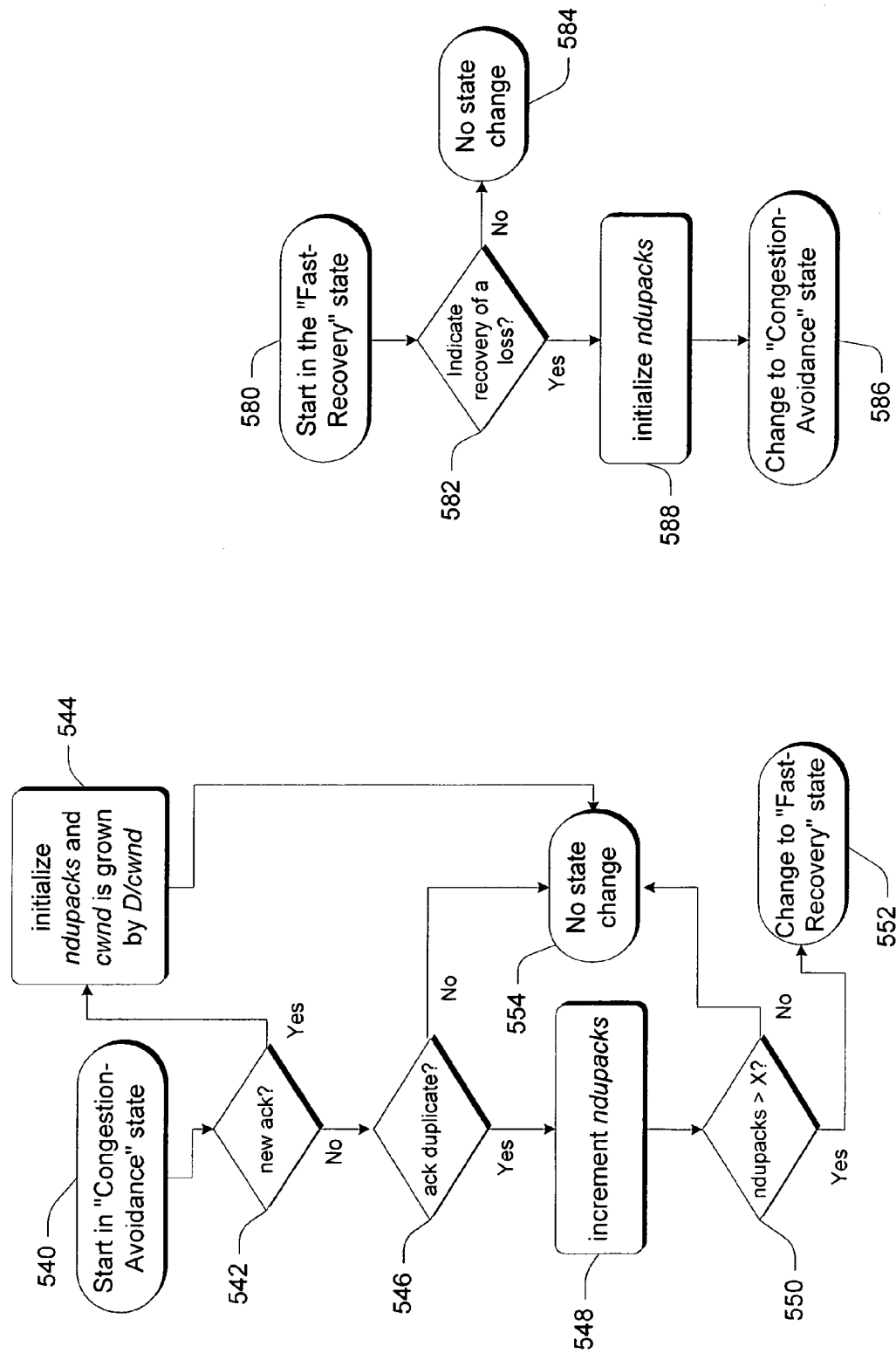

ROBUST, INFERENTIALLY SYNCHRONIZED TRANSMISSION OF COMPRESSED TRANSPORT-LAYER-PROTOCOL HEADERS

CROSS-REFERENCE TO RELATED APPLICATIONS

This application claims priority from U.S. Provisional Patent Application Ser. No. 60/249,712, entitled "A Robust Header Compression Scheme for TCP/IP" filed on Nov. 16, 2000. This application is a divisional of to U.S. patent application Ser. No. 09/848,848, filed May 3, 2001, which itself claimed priority from U.S. Provisional Patent Application Ser. No. 60/249,712. The disclosure of U.S. Provisional Patent Application Ser. No. 60/249,712 and U.S. patent application Ser. No. 09/848,848 are incorporated by reference herein)

TECHNICAL FIELD

This invention generally relates to a technology for transmitting compressed network transport-layer-protocol headers in a speedy, efficient, inferentially synchronized, and robust manner.

BACKGROUND

With recent improvements in processor, storage and networking technologies, today's wireless communications devices take many different forms, and offer a number of innovative features. Examples of this new class of wireless communication devices include personal digital assistants ("PDAs") fitted with a (wireless communications interface, two-way paging devices, digital communications devices, and third-generation ("3G") personal communicators.

Gone are the days when such devices are merely used to support verbal communication. Today, consumers are demanding that such devices be multifunctional, enabling a user to receive and/or retrieve email, to send/receive text messages, and to access text-based content from the Internet (e.g., stock quotes, flight arrival/departure information, etc.). Despite the recent innovation in the wireless communication space, consumers are demanding even greater application resources and functionality for their portable communication devices.

Heterogeneous Network

FIG. 1 illustrates an example of a heterogeneous network 100 comprised of a wireline component 110 and a wireless component 130. The wireline component 110 includes a wireline link 112 to the Internet 102 (or other network) and a wireline-to-wireless gateway 120. It also includes a wireline link 114 to the Internet 102 (or other network) and an Internet server 104. The gateway 120 includes a host computer 122 and wireless transmitter 124. The wireless component 130 of the heterogeneous network 100 includes a wireless link 132 between the gateway 120 and wireless devices 140. These devices may include any wireless portable devices, such as a laptop computer, a mobile telephone, a PDA, and the like.

In this heterogeneous network 100, data packets with their accompanying headers are sent from the server 104 through the wireline link 114, through the Internet 102, through the wireline link 112, and to the gateway 120. The gateway sends the packets and their headers via the wireless link 132 to the wireless devices 140.

It is a challenging task to transmit massive amounts of data (e.g., streaming media content) over such a heterogeneous network. One reason is that the transport-layer-protocol associated with each of the disparate components was developed independent of one another and, therefore, without regard for many of the design challenges of the other.

For example, the control algorithm of a typical wireline transport-layer-protocol (e.g., TCP, UDP, etc.) assumes that any degradation in transmission quality (e.g., packet loss) is due to congestion problems in one or more of the network elements (e.g., router, switch, hub, etc.). Accordingly, conventional transport-layer-protocols will iteratively reduce the transmission rate until transmission quality is improved.

However, in heterogeneous networks that include a wireless network component, the degradation in transmission quality may have nothing to do with congestion on the wireline component of the communication channel. That is, the degradation in transmission quality, measured in terms of a bit-error rate ("BER"), may well be caused by a fading condition, a shadowing effect, multi-path sources, long round-trip-times (RTT), etc. in the wireless communication channel.

Since conventional wireline transport-layer-protocols assume that degradation in transmission quality is the result of congestion, its default reaction is to reduce the transmission rate. However, such reaction will not improve transmission quality when the actual problem is a fading condition in the wireless component of the communication channel. The same is true for the other conditions that produce BER in the wireless communication channel.

The bandwidth of wireless links is always scarce due to properties of the physical medium and regulatory limits on the use of frequencies for radio communication. Therefore, it is necessary for network protocols to efficiently utilize the available bandwidth.

Despite such limitations, conventional transport-layer-protocols are often employed to provide the Internet content available to wireless devices. As a result, the wireless Internet access user experience is often disappointing. This is because wireless Internet access is unable to fully utilize the limited bandwidth available because of the repeated reduction in transmission rates resulting from the inherent BER of the wireless link.

TCP/IP Headers

The most common transport-layer-protocol on the Internet is TCP/IP. It is used for both wireline and wireless communication channels. However, one problem with using TCP/IP over wireless links is the large header overhead. For example, a typical TCP/IP packet has, in addition to link layer framing, an IP header (twenty octets in IPv4 and forty octets in IPv6), a TCP header (twenty octets) for a total of forty octets in IPv4 and sixty octets in IPv6. According to proposals for new protocol standards, future generations of TCP/IP will include larger headers.

The header size is a significant per-packet penalty for wireless system. This means that in light to the available bandwidth and the frequency of BERs, which necessitate retransmissions, the per-packet overhead for the header is significant. Therefore, it is desirable to reduce the header size to make low-bandwidth wireless applications more efficient. Thus, the header may be reduced by compressing it. Since a typical TCP header includes a portion of data that does not change frequently with successive headers, the headers may be compressed to a size significantly smaller than their original size.

In general, it is desirable for the header of a transport-layer-protocol (such as TCP/IP) to be losslessly compressed so that the decompressed header is identical to the header before compression. In addition, it is desirable for the header to be compressed with a high compression ratio. See "RFC 2507" (M. Degermark, B. Nordgren, and S. Pink, "IP Header Compression", Internet RFC 2507, February 1999 at www.ietf.org/rfc/rfc2507.txt?number=2507) for general background information regarding header compression.

However, compressed data is less tolerant to non-trivial data loss. As mentioned before, wireless links have an inherent degradation in transmission quality, which introduces non-trivial data loss. This data loss degree is generally represented as bit-error rate ("BER") and may be the result of fading condition, a shadowing effect, multi-path sources, long round-trip-times (RTT), etc. This degradation makes conventional transport-layer-protocol header compression (such as that of the TCP/IP header) perform poorly.

Conventional Header Compression and Transmission Schemes

In FIG. 1, the gateway 120 is the header-compressor ("HC") and the wireless device 140 is the header-decompressor ("HD"). The wireless device 140 is also considered the "receiver" over the wireless link 132. The gateway 120 compresses the header before sending it over the wireless link 132. The wireless device 140 de-compresses the header when it receives the compressed header.

In general, network transport-layer protocol header compression and transmission ("HCT") maintain contexts of a flow at both the HC and the HD sides, which contain relevant information to compress and decompress the packet header correctly. Normally, the HD will keep strictly synchronized with the HC, thus it can decompress the compressed packet header correctly.

But under some conditions, the HD's context may be inconsistent or out-of-sync with the HC (e.g., the packet losses due to the link error). Because of this inconsistency, the successive packets cannot be decompressed correctly and will be dropped eventually. This effect, so-called "error propagation," will last until the contexts are brought into synchronization. This will degrade the performance of network transport-layer protocol (such as TCP), especially on relative high BER link, such as wireless channel.

Examples of conventional schemes for compressing the header of a transport-layer-protocol (such as TCP/IP) include "VJHCT", "IPHCT", and "FBHCT."

VJ Compression and Transmission (VJHCT) Scheme

For TCP, the original proposed header compression scheme is Van Jacobson's header compression algorithm, VJHCT, defined in Van Jacobson, "Compressing TCP/IP headers for low-speed serial links", Internet RFC 1144, February 1990 at www.ietf.org/rfc/rfc1144.txt?number=1144.

Following the transmission of the first uncompressed TCP/IP header, only the encoded difference to the preceding header, is transmitted. In most cases, VJHCT can compress the 40 octets full TCP/IPv4 header to only 4 octets and improves the TCP performance significantly on bandwidth-limited links. However, due to the differential encoding, once a delta is lost on the link between the HC and the HD, a series of packets rebuilt upon the HD's inconsistent context will be discarded eventually at the receiver end.

During this period, no acknowledgment will be sent back to the TCP receiver, thus the TCP's self-clocking nature is broken. As a result, the TCP sender is forced into a timeout. When used over wireless links, VJHCT causes frequently timeout and thus degrades TCP performance significantly.

In the VJHCT scheme, the HC 120 and HD 140 are strictly synchronized to ensure the correct reception of the compressed headers. The HC 120 sends data packets with their accompanying compressed headers via a data channel 152, which is typically a simplex serial link. Via a feedback channel 154, the HD 140 returns feedback indicating whether the headers were successfully received and decompressed.

The VJHCT scheme uses delta coding in header compression and is highly dependent upon the strict synchronization between HC 120 and HD 140. A loss of strict synchronization typically leads to incorrect packets dropping at the HD side, which in turn cause TCP retransmissions and even timeout. In the case of wireless links, error induced strict synchronization loss is very frequent. Such loss significantly degrades the performance of TCP.

The VJHCT scheme relies on transmitting only the difference from the previous header in order to reduce the large overhead of TCP/IP header. Considering the high BER in wireless channels, if a packet gets lost, the compressed header of next packet cannot be correctly decompressed. Then the HD must send the request for resynchronization and in the meanwhile discard the current compressed header. A serious result of this effect is that it prevents the "TCP Fast Retransmit" algorithm from being fired and causes TCP retransmission timeout.

IP Header Compression and Transmission (IPHCT) Scheme

The IPHCT scheme is a low-loss TCP/IP header compression scheme that is based on VJHCT. It is described in more detail in RFC 2507 (cited above). Besides few modifications on VJHCT, IPHC adds two mechanisms: the TWICE algorithm and the explicit header-request mechanism.

The TWICE algorithm is a local context repair mechanism. It assumes that only the sequence number or acknowledgment number changes during the connection and the deltas among consecutive packets remain constant in most cases. However, such assumptions are not always true, especially when timestamp and SACK options are added in the TCP header. It is hard for TWICE algorithm to recover the context by simply applying the previous delta twice to the context only.

For explicit header-request mechanism, a feedback channel from the HD to the HC is needed. When the HD fails to repair the context, it may optionally send a CONTEXT_STATE packet back to the HC to indicate that one or more contexts are invalid. Upon receiving such requests, the HC will send full TCP/IP headers to re-synchronize the contexts. The IPHCT scheme needs at least a link round-trip time to recover from the inconsistency. On some links with relative high bandwidth and long round-trip time, such as wireless WAN, there are several additional packets dropped before the context is repaired by explicit header request. This may lead to a rather long TCP Fast-Recovery period or timeout when there are not enough flying segments on the end-to-end path.

Fixed-Base Header Compression and Transmission (FBHCT) Schemes

The FBHCT schemes are discussed in Stephen Pink, Matt Mutka, "Dependency Removal for Transport Protocol Header Compression over Noisy Channels", *In Proceedings of ICC'97*; and Anna Calveras-Augé, Miquel Arnau-Osorio, Josep Paradells-Aspas, "A Controlled Overhead for TCP/IP Header Compression Algorithm over Wireless links", *In Proceedings of Wireless'99*.

These schemes attempt to reduce the loss of strict synchronization by removing the dependence that is implicitly transmitted on the link. The interpacket dependency is eliminated by using a fixed base, or reference. Thus, once the HD and the HC agree on the same base, a single corrupted packet doesn't affect the rebuilding of the successive packets.

Although these schemes are more robust to link errors than VJHCT and IPHCT are, the introduced overhead reduces its effectiveness over noiseless channels. The FBHCT schemes haven't provided a solution to control such overhead in a practical way. In the meanwhile, the FBHCT schemes are not completely free from the inconsistency once the fixed base is lost on the link.

Conventional Schemes Require Strict Synchronization

These conventional TCP/IP header compression and transmission schemes are insufficient and inefficient. That is because they require strict synchronization between the transmitting HC and the receiving HD so that the HC can be sure that the HD received the header and received it correctly. Such strict synchronization is typically implemented by a feedback channel (such as channel 154 in FIG. 1).

Strict synchronization, however, slows down the already bandwidth-limited wireless link. It is inherently slower than an asynchronous (or inferentially synchronized) technique because the sender (e.g., HC 120) is waiting for the receiver (e.g., HD 140) to respond.

Strict synchronization is slow because of the intrinsic high BER and long RTT of wireless communications results in frequent loss of strict synchronization between the HC and HD. This sync-loss forces the HC to resend uncompressed headers (i.e., TCP retransmissions) to reestablish synchronization. High BER of wireless communication causes sync-loss when there are errors in compressed packets received by the HD. Long RTT of wireless communication causes a communication delay while the HC waits for the HD to specifically request a resend of a full header.

What is needed is a header compression and transmission technique that does not rely on strict synchronization between the HC and the HD but can, nevertheless, refresh the context when the HD lose the synchronization completely.

SUMMARY

Described herein is a technology for transmitting compressed network transport-layer-protocol headers in a speedy, efficient, inferentially synchronized, and robust manner.

An implementation, described herein, models the transmission of compressed headers to the congestion procedure of the network transport-layer protocol (e.g., TCP's). Doing so, the sender of the compressed headers can infer whether the receiver correctly received them. Unlike the slow, direct and strict synchronization employed by conventional schemes, this implementation of the present claimed invention inferentially synchronizes by modeling after the congestion procedure of the network transport-layer protocol. This is inherently faster than direct strict synchronization.

An implementation, described herein, combines a window-based least significant bit ("LSB") encoding mechanism and a transport-layer protocol (e.g., TCP) congestion window tracking mechanism together. The window-based LSB encoding mechanism reduces error propagation. The TCP congestion window tracking mechanism improves the efficiency of the window-based encoding. With the dynamical congestion window tracking, a feedback channel is not required. Since the implementation performs well over both noiseless and noisy links, it is particularly suited to use over wireless communications channels.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same reference numbers are used throughout the figures to reference like components and features.

FIGS. 4A-C are flow diagrams showing examples of methodological implementations of the invention claimed herein.

FIGS. 5A-C are flow diagrams showing examples of methodological implementations of the invention claimed herein.

DETAILED DESCRIPTION

The following description sets forth one or more specific embodiments of a robust, inferentially synchronized transmission of compressed transport-layer-protocol headers that incorporate elements recited in the appended claims. These embodiments are described with specificity in order to meet statutory written description, enablement, and best-mode requirements. However, the description itself is not intended to limit the scope of this patent.

The one or more specific embodiments, described herein, are exemplary implementations of the robust, inferentially synchronized transmission of compressed transport-layer-protocol headers. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a robust, inferentially synchronized transmission of compressed transport-layer-protocol headers may be referred to as an exemplary Robust, Inferentially-Synchronized Header Compression and Transmission technique or, more simply, an "exemplary RLS-HCT technique."

Incorporation by Reference

The following co-pending provisional patent application is incorporated by reference herein: U.S. Provisional Patent Application Ser. No. 60/249,712, entitled "A Robust Header Compression Scheme for TCP/IP" filed on Nov. 16, 2000.

The following co-pending patent application is incorporated by reference herein: U.S. patent application Ser. No. 09/848,706, entitled "An Architecture and Related Methods for Streaming Media Content through Heterogeneous Networks" filed on May 2, 2001, and assigned to the Microsoft Corporation.

Introduction

Figure 1:
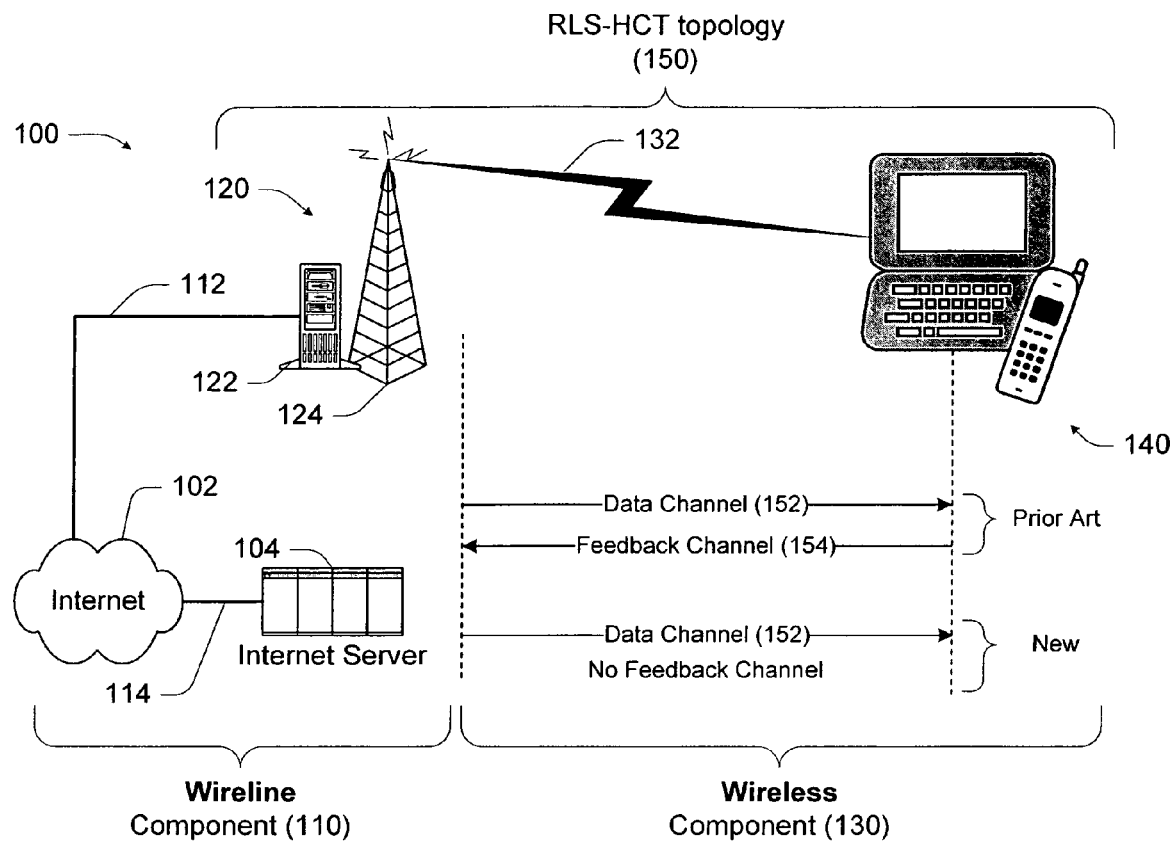
FIG. 1 is a schematic diagram of a data network within which the teachings of the present invention may be practiced.
Figure 7:
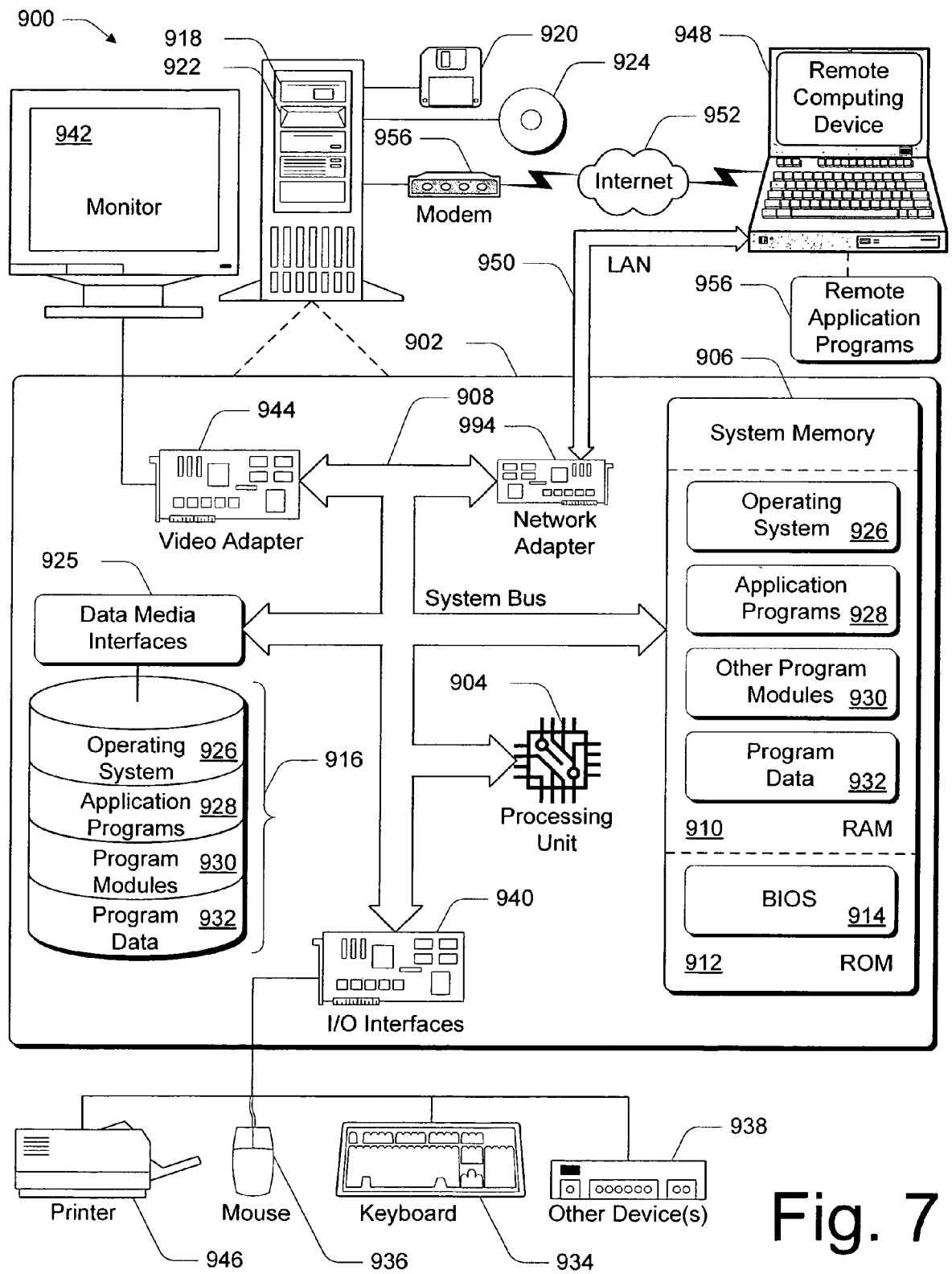
FIG. 7 is an example of a computing operating environment suitable for implementing an implementation (wholly or partially) of the invention claimed herein.

The one or more exemplary implementations, described herein, of the present claimed invention may be implemented (in whole or in part) by a RLS-HCT topology 150 of FIG. 1 and/or by a computing environment like that shown in FIG. 7.

Herein, references are made to TCP or TCP/IP, which is the most common transport-layer protocol used on the Internet. Although such reference may specifically be to TCP or TCP/IP, those who are ordinary skill in the art understand and appreciate that the inventors intend to refer generally to any comparable or equivalent network transport-layer protocol. The references, herein, to TCP or TCP/IP and their associated headers are provided for illustrative purposes so that specific examples may be discussed.

The exemplary RLS-HCT technique overcomes the problems of conventional header compression and transmission ("HCT") schemes, such as those discussed above in the "Background" section. It does this by eliminating the need for feedback from the header-decompressor ("HD") within its header-compression and transmission protocol. In other words, the HD of the wireless device does not provide feedback regarding the correct reception of the compressed headers. Doing this avoids the inevitable delays caused by the header-compressor ("HC") waiting for feedback from the HD to establish and maintain synchronization.

To enhance robustness over a wireless over links (e.g., wireless links) with non-trivial bit-error rates ("BER") and/or long round-trip times ("RTT"), the exemplary RLS-HCT technique combines window-based least significant bit ("LSB") encoding and transport-layer protocol (e.g., TCP) congestion window tracking mechanisms together.

Overview

In general, the exemplary RLS-HCT technique compresses and transmits headers of network transport-layer protocol (e.g., TCP/IP) over noisy and noiseless links. In general, this exemplary RLS-HCT technique has one or more of the following characteristics:

- the network transport-layer protocol's header is compressed so that it has a high compression ratio;
- the header is compressed loss-lessly (i.e., a header compression must be decompressed to be identical to the header before compression);
- the HC does not rely on responses from the HD to indicate whether to retransmit a full TCP header (i.e., no strict synchronization);
- the header compression is robust against the loss between HC and HD.

The exemplary RLS-HCT technique combines the Window-based least significant bit ("LSB") encoding ("W-LSB encoding") and TCP congestion window tracking. A sliding window (VSW) is maintained on the HC side. In W-LSB encoding, the HC gets inconsistent with the HD only when the reference value on the HD side is out of this VSW. By keeping the sliding window large enough, the HC rarely gets out of synchronization with the HD.

However, the larger the sliding window is, the less the header compression gains. To shrink the window size, the HC needs some form of feedback to get sufficient confidence that a certain value will not be used as a reference by the HD, but that feedback need not be direct. Then the window can be advanced by removing that value and all other values older than it. When a feedback channel is available, confidence is achieved by proactive feedback in the form of "ACKs" (i.e., acknowledgements) from the HD. A feedback channel, however, is undesired, impossible, or expensive in some environments. The exemplary RLS-HCT technique includes a mechanism based on dynamically tracking TCP congestion window to explore such feedbacks from the inherent feedback-loop of TCP protocol itself.

Since TCP is a window-based protocol, a new segment cannot be transmitted without getting the acknowledgment of segment in the previous window. Upon receiving the new segment, the HC can get enough confidence that the HD has received the segment in the previous window and then shrink the sliding window by removing all older values of that segment.

TCP has with four congestion control algorithms: slow-start, congestion-avoidance, fast retransmit, and fast recovery. The effective window of TCP is mainly controlled by the congestion window and may change during the entire connection life. The exemplary RLS-HCT technique includes a mechanism to track the dynamics of TCP congestion window, and manage the sliding window of W-LSB encoding by the estimated congestion window. By combining the W-LSB encoding and TCP congestion window tracking, the exemplary RLS-HCT technique can achieve better performance over high bit-error-rate links.

Note that in one-way TCP traffic, only the information about sequence number or acknowledgment is needed to track TCP congestion window. The exemplary RLS-HCT technique does not impose that all one-way TCP traffic must cross the same HC. The detail will be described in the following sections.

Packet Types

The exemplary RLS-HCT technique uses the following packet types in addition to the IPv4 and IPv6 packet types.

UNCOMPRESSIBLE PACKET—includes the Non-TCP packets and "uncompressible" TCP packets.

COMPRESSIBLE PACKET—this can be further divided into:

UNCOMPRESSED_TCP—indicates a packet with an uncompressed header including a CID (Context IDentifier). It establishes or refreshes the context for the packet stream identified by the CID.

COMPRESSED_TCP—indicates a packet with a compressed TCP header containing a CID, a flag octet identifying which fields have changed, and the changed fields encoded as the difference to the previous value.

In addition to the packet types used for compression, regular IPv4 and IPv6 packets are used whenever a HC decides not to compress a packet.

Compression States

Figure 2:
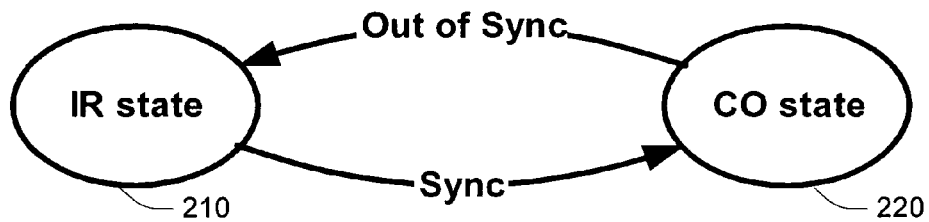
FIG. 2 is a state diagram illustrating the states and the transitions between such states of an embodiment of the invention claimed herein.

As shown in FIG. 2, the exemplary RLS-HCT technique has two compression states: Initialization and Refresh (IR) state 210, and COmpression (CO) state 220.

The HC starts in the lowest compression state (IR 210) and transits gradually to the higher compression state (CO 220). The HC will always operate in the highest possible compression state, under the constraint that the HC is sufficiently confident that the HD has the information necessary to decompress a header, which is compressed according to the sate.

Initialization and Refresh (IR) State 210

The purpose of IR state 210 is to initialize or refresh the static parts of the context at the HD. In this state, the HC sends full header (UNCOMPRESSED_TCP) periodically with an exponentially increasing period, which is so-called compression slow-start. The HC leaves the IR state 210 only when it is confident that the HD has correctly received the static part information.

COmpression (CO) State 220

The purpose of CO state 220 is to efficiently transmit the difference between the two consecutive packets in the TCP stream. When operating in this state, the HC and the HD should have the same context. Only COMPRESSED_TCP packet is transmitted from the HC to the HD in this state. No full header information is needed. The HC leaves the CO state 220 only when it finds that the context of HD may be inconsistent, or there are remarkable changes in the TCP/IP header.

Example Heterogeneous Network

As discussed above in the Background section, FIG. 1 is a diagram of an example heterogeneous network, which is presented, within which the teachings of the present invention may be practiced, according to one example embodiment. More specifically, FIG. 1 illustrates a diagram wherein one or more wireline hosts 104 (e.g., content servers, Internet servers) are coupled to provide data to one or more wireless devices 140 through a heterogeneous network comprised of a wireline network component 110 and a wireless network component 130.

The wireline network component 110 and wireless network component 130 are each intended to represent a wide variety of such networks known in the art. In this regard, the wireline network component 110, for example, may well be comprised of a local area network (LAN), wide-area network (WAN), private network, global public network (Internet), and the like. Similarly, the wireless network component 130 may well be comprised of a cellular telephony network, a third generation digital communication system network, a personal area network (PAN), a personal communication system (PCS) network, a digital cellular telephony network, a two-way paging network, a two-way radio network, a one-way broadcast radio network, a wireless local area network (WLAN) and the like.

Similarly, the wireless communication channel 132 is intended to represent any of a wide variety of wireless communication links such as, for example, a radio frequency (RF) communication link, an infrared (IR) communication link, and the like commonly associated with any of the wireless communication networks above.

Network gateway 120 is an intermediate network node coupling the wireline communication link with a wireless communication link. In this regard, the network gateway may well be a router, a switch, a hub, a wireless base station controller, and the like.

As used herein, wireline host 104 is intended to represent any of a wide variety of computing devices, which provide content to requesting users. According to one implementation, one wireline host 104 is a content server, to stream media content to requesting users upon request. In this regard, host 104 may well comprise a personal computing system, a server computing system, a media server farm, a KIOSK, thin client hosts, thick client hosts, and the like. According to one implementation, wireline host 104 invokes an instance of a content delivery application upon receiving a request for content from a requesting user. In a conventional manner, the wireline host 104 implements congestion control at the transport layer based, at least in part on congestion feedback received from the network gateway 120, in particular. Again, in a conventional manner, error control is performed at the application layer (e.g., by the content delivery application) and/or at the transport layer based, at least in part, on information received from the wireless devices 140.

Wireless devices 140 are also intended to represent any of a wide variety of computing devices with wireless communication facilities. In this regard, wireless devices 140 may well comprise cellular telephones, digital wireless telephones, personal digital assistant (PDA) with wireless communication facilities, a personal computing system with wireless communication facilities, and the like. A wireless device 140 invokes an instance of an application to request and receive content from a wireline host 104.

Inferential Synchronization Between Gateway and Wireless Devices

Herein, the term "strict synchronization" refers to the existence of direct synchronization between two transmitting-receiving entities, in particular the HC and HD. The term "inferential synchronization" indicates that there is no direct synchronization between two transmitting-receiving entities (in particular the HC and HD), but they may be inferentially synchronized (e.g., via indirect mechanisms).

When the HD and HC are strictly synchronized, they are taking active steps to maintain synchronization, typically through a feedback channel (such as the channel 154 of FIG. 1). When the HD and HC are inferentially synchronized, they are not taking active steps to maintain synchronization. Rather, they are synchronized inferentially (i.e., indirectly).

Herein, the term "feedback" refers to direct feedback between two transmitting-receiving entities, in particular the HC and HD. Thus, a feedback-dependent transmission is one that relies on direct feedback while transmitting. Conversely, a feedback-independent transmission is one that does not rely on direct feedback.

According to at least one implementation of the invention, nothing identifies transmission problems (e.g., multipath, fading, high BER problems, etc.) that are unique to the wireless communication channel 132. Rather, this implementation relies on the conventional transport-layer protocol to indicate a packet loss and activate conventional transport-layer congestion control. When the wireless device 140 fails to receive a packet or receives a corrupted packet because of multipath, fading, high BER problems, or similar problems, sends an a conventional transport-layer packet loss indication back to the original sender, the wireline host 104.

Unlike the conventional header compression and transmission schemes, the wireless device 140 does not send any feedback to the gateway 120. It does not strictly synchronize with the gateway 120. It does not indicate successful header reception. It does not indicate unsuccessful header reception. Since there is no direct feedback regarding header reception, the gateway 120 assumes that the wireless device 140 receives the header successfully.

How can the gateway 120 make this assumption? At least, two ways. The first is by controlling and adjusting the window of packets sent to the wireless device 140. The second is by relying on the conventional transport-layer protocol's congestion control algorithm (such as that of TCP/IP) to indirectly correct any lost or corrupted headers.

When a header is lost or corrupted, its associated packets are also lost or corrupted. Therefore, the wireless device 140 will indicate this problem to the wireline host 104, the host will resend the problem packets, and, as a result, the gateway will resend the packets with their compressed headers to the wireless device. Unlike conventional schemes, the gateway 120 does not actively detect or determine if the wireless device received corrupted headers or is missing headers.

In effect, the gateway 120 never actually resends problem headers. Rather, it may send the same headers again to the wireless device 140, but it does so at the direction of the wireline host 104 and in accordance with the conventional transport-layer protocol procedures. The gateway 120 need not be aware that it is sending the same headers again. Since it makes no active choice to resend the same headers, these resent headers appear to be just like any other headers sent by the wireline host to the gateway 120 in the normal course of the TCP procedures.

Since the exemplary RLS-HCT technique models its transmission of compressed headers to the TCP congestion procedure, the HC can infer whether the HD correctly received the compressed headers. Unlike the slow direct synchronization employed by conventional schemes, the exemplary RLS-HCT technique inferentially synchronizes by modeling after the TCP congestion procedures. This is inherently faster than direct synchronization.

How is this faster than the conventional schemes? The exemplary RLS-HCT technique is faster because the gateway does not wait for feedback from the wireless devices 140. Considering the intrinsic BER and RTT of wireless communications, the exemplary RLS-HCT technique provides for substantial time savings by avoiding the frequent wait for feedback resends, which are necessitated the BER and RTT.

In light of the intrinsic BER and RTT of wireless communications, won't this approach ultimately be slower because it will increase the frequency of lost/corrupted headers, which will result in a corresponding increase in the frequency of traffic-congestion resends from the wireline host 104? The answer is "no" because the exemplary RLS-HCT technique includes an aspect that reduces the frequency of lost/corrupted header that result from BER and RTT over wireless communications. That aspect is discussed in more detail herein.

Window-based LSB Encoding

The window-based least significant bit ("LSB") encoding (W-LSB encoding) doesn't encode a value by only referring to one base value. Instead, it tries to encode it based on the common part of a group of values, the sliding window (VSW), and only sends the different part. Using W-LSB encoding, the HD can decompress the encoded value correctly once any value in its referenced VSW can be delivered successfully. The more values the VSW has, the higher the probability that an encoded value would be decompressed correctly. In the meantime, however, the common part of VSW decreases. As a result, W-LSB encoding becomes less efficient. When the HC knows what values in VSW have been received by the HD, the sliding window can be shrunk to obtain a rather high compression ratio.

To shrink the VSW, the HC needs some means to get feedbacks that indicate what value has been received by the HD. Since TCP itself is a window-based protocol, a new segment cannot be transmitted without getting the acknowledgment of the segment in the previous window. When receiving a new segment, the HC gets enough confidence that the HD has received the segment in the previous window and shrinks the sliding window by removing that segment and all segments older than the segment in the previous window.

By using W-LSB encoding, the HC would not come into the inconsistency with the HD unless all values in the VSW are lost. To improve the compression efficiency, the mechanism for accurate congestion window estimation is discussed in the following section titled "TCP Congestion Window Estimation."

Now, W-LSB encoding, as implemented by the exemplary RLS-HCT technique, is explained in a more mathematical fashion. The basic concepts of W-LSB encoding are:

The HD uses one of the decompressed header values as a reference value, v_ref. The reference may be chosen by various means—one approach might be to select only headers whose correct reconstruction is verified by the TCP checksum ("secure" reference).

The HC maintains a sliding window of the values (VSW) that may be chosen as a reference by the HD. It also maintains the maximum value (v_max) and the minimum value (v_min) of VSW.

When the HC has to compress a value v, it calculates the range r=max(|v−v_max|,|v−v_min|). The value of k needed is k=$\lceil \log_2(2r+1) \rceil$, i.e., the HC sends the k LSBs of v as the encoded value.

The HC adds v into the VSW and updates v_min and v_max if the value v could potentially be used as a reference by the HD.

The HD chooses the one, which is closest to v_ref and whose k LSB equals the compressed value that has been received, as the decompressed value The window-based encoding can tolerate loss if the HD's reference value is one of the HC's VSW. Suppose the HC wants to transmit a sequence of monotonic increasing values to the HD, and these values have the same context at some time $t_0$. The HC has a sliding window, $VSW_{t_0}$, with n values, $v_0 \leq v_1 \leq \ldots \leq v_{n-1}$, and its maximum and minimum values are $v\_min_{t_0}=v_0$ and $v\_max_{t_0}=v_{n-1}$. The HD always uses the latest "secure" value as the reference, which should be any one of $VSW_{t_0}$.

More specifically, suppose the reference value is $v\_min_{t_0}=v_0$, meaning all compressed values after $v_0$ are corrupted during the transmission from the HC to the HD. That is, there are n−1 lost values. Then, the HC transmits another value $v_n$ and shrinks the sliding window to keep its size to n. If the HD receives this compressed $v_n$ successfully, it will recovery them from the consecutive n−1 lost values. Otherwise, the HD will be out-of-sync with the HC since the HC's sliding window is $v_1 \leq v_2 \leq \ldots \leq v_n$ but the HD's reference value is $v_0$, which is out of the HC's sliding window. Thus, the losses are recoverable unless if there are n consecutive values lost, while the HD always keep the sync with the HC and can tolerate m consecutive losses, where m<n.

The basics of W-LSB encoding is discussed in C. Bormann (ed.), et al., "RObust Header Compression (ROHC)", Internet Draft (work in progress), Oct. 23, 2000. (http://www.ietf.org/internet-drafts/draft-ietf-rohc-rtp-06.txt).

Briefly, the major modifications to the basic W-LSB encoding (discussed above and in Bormann) employed by the exemplary RLS-HCT technique are generally as follows:

For reference selection, the decompressor chooses the one which is the last received non-retransmission value or uncompressed value that had passed the TCP checksum successfully.

After sending a value v (compressed or uncompressed), the compressor always adds v into the VSW since each TCP segment is protected by the TCP checksum.

This modified W-LSB encoding will be applied to IP-ID, Sequence Number, Acknowledgment Number, Window fields, and TCP Timestamp option in the exemplary RLS-HCT technique.

However, the window-based encoding is not efficient if the sliding window, VSW, never shrinks (but in this way, the HD can tolerate more consecutive losses). To prevent k from increasing too much, the sliding window is shrunken (or moved forward). To do that, the HC only needs to know which values in VSW have been received by the HD and removes it from the VSW.

However, the feedback channel is undesired or impossible in many cases. Since TCP is a window-based protocol, the maximum number of outstanding packets can not exceeds the window size. If the size of sliding window in window-based encoding exceeds the window size of a 1-way TCP traffic (normally, a TCP connection composes of two 1-way traffics with each one as the receiver of the other), the HC can get enough confidence that the VSW can shrink now. The window size of a 1-way TCP traffic is the minimum of the congestion window and the advertised window from the receiver. Since the advertised window can be accessed on the forward-path of the 1-way TCP traffic, the sliding window shrinks by estimating TCP congestion window in our scheme (since memory has been cheap enough in contemporary, the advertised window is large enough to consider only the limits of congestion window).

TCP Congestion Window Estimation

In TCP, the effective window is no larger than the congestion window. By estimating the congestion window accurately and adjusting the W-LSB encoding accordingly, the exemplary RLS-HCT technique achieves highly robust transmission of compressed headers.

Model-based Estimation

The model-based approach is based upon the TCP performance model. It estimates the maximum TCP congestion window.

The authors of "Modeling TCP throughput: a simple model and its empirical validation" (J. Padhye, V. Firoiu, D. Towsley, and J. Kurose. *ACM SIGCOMM*, September 1998) propose a simple TCP throughput model. Based on this model, the maximum congestion windows size of can be calculated as follows:

$$W = \sqrt{\frac{8}{3l}}, \quad (1)$$

where l is the packet loss rate between TCP peers and W is the TCP congestion window size.

Suppose the packet loss rate between TCP peers is l. If no dependency is considered, the packet loss rate l may be calculated by using the following equation:

$$l = \frac{1}{\bar{n}+1}, \quad (2)$$

where $\bar{n}$ is the average length of consecutive packets without error.

From equation (1) and (2), the following may be obtained:

$$W = \sqrt{\frac{8(1+\bar{n})}{3}} \quad (3)$$

The HC can measure $\bar{n}$ to estimate the maximum TCP congestion window size W. However, a relative long period is needed to get a less noisy value for $\bar{n}$. This model-based approach needs a long response-time to catch up the dynamics of congestion window. This would bring the risks that this approach may underestimate the congestion window and cause the inconsistency by shrinking the VSW more aggressively.

To solve this problem, a mechanism called TCP "congestion window tracking" is implemented by the exemplary RLS-HCT technique to dynamically estimate TCP congestion window. The main idea behind it is to reconstruct the congestion control behavior of TCP sender at the HC.

Congestion Window Tracking

The general principle of congestion window tracking is as follows. The HC imitates the congestion control behavior of TCP upon receiving each segment, and in the meantime estimates the congestion window (cwnd) and the slow start threshold (ssthresh). Besides the requirement of accuracy, there are also some other requirements for the congestion window tracking approaches:

Simplex link. The approach should work well without imposing additional requirements on topology.

Misordering resilience.

Multiple-links. The approach should work even when not the whole one-way traffic crosses a single link.

Slightly overestimation. When it cannot guarantee the accuracy, it should slightly overestimate the cwnd and ssthresh.

In order to estimate a correct congestion window ("cwnd"), it is necessary to know the congestion control algorithm that it is acting. Although Tahoe, Reno, NewReno, Sack1 and other TCP variants differ greatly from each other in the behavior during the Fast-Retransmit and Fast-Recovery stage, the principle of TCP congestion control algorithm is summarized in FIG. 3. The details of it can be found in V. Jacobson. "Congestion avoidance and control". In *ACM SIGCOMM* '88, 1988 and V. Jacobson, "Modified TCP congestion control algorithm". Note to end2end-interest mailing list., April 1990.

Figure 3:
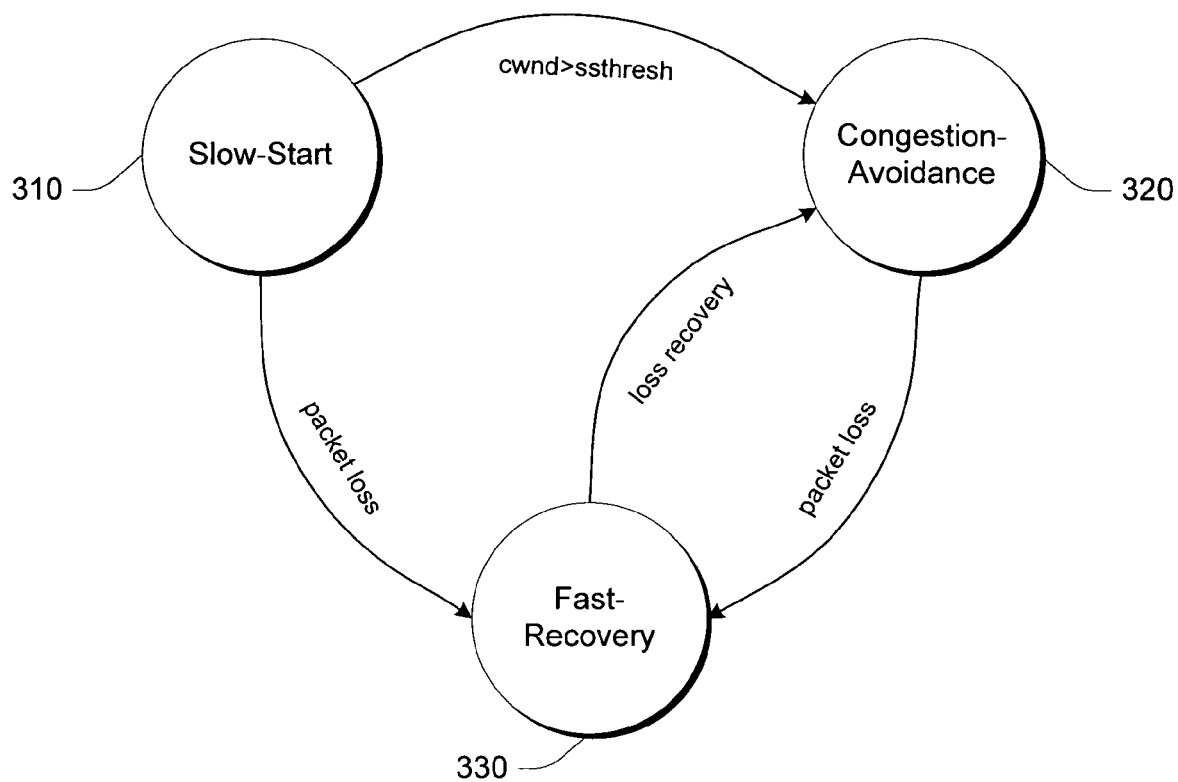
FIG. 3 is a state diagram illustrating the states and the transitions between such states of a network transport-layer protocol (such as TCP); such states being a model for the states of an embodiment of the invention claimed herein

FIG. 3 shows the three states of the congestion window estimation of the exemplary RLS-HCT technique. These states mimic the states of TCP congestion control algorithm: Slow-Start 310, Congestion-Avoidance 320, and Fast-Recovery 330. The congestion window estimation of the exemplary RLS-HCT technique maintains two state variables cwnd and ssthresh, the former is the estimated congestion window size, and the later is the slow-start threshold.

The exemplary RLS-HCT technique employs one of two TCP congestion-window tracking approaches, described below. One approach is based on the sequence number and the other is based on the acknowledgment number.

Approach A: Tracking Based on Sequence Number

FIG. 3 depicts the states of this approach and the transitions between these states. Upon receiving a segment, the approach tries to deduce the behaviors taken at the TCP sender from the sequence number, and then adjusts cwnd and ssthresh accordingly.

Figures 4A, 4B:
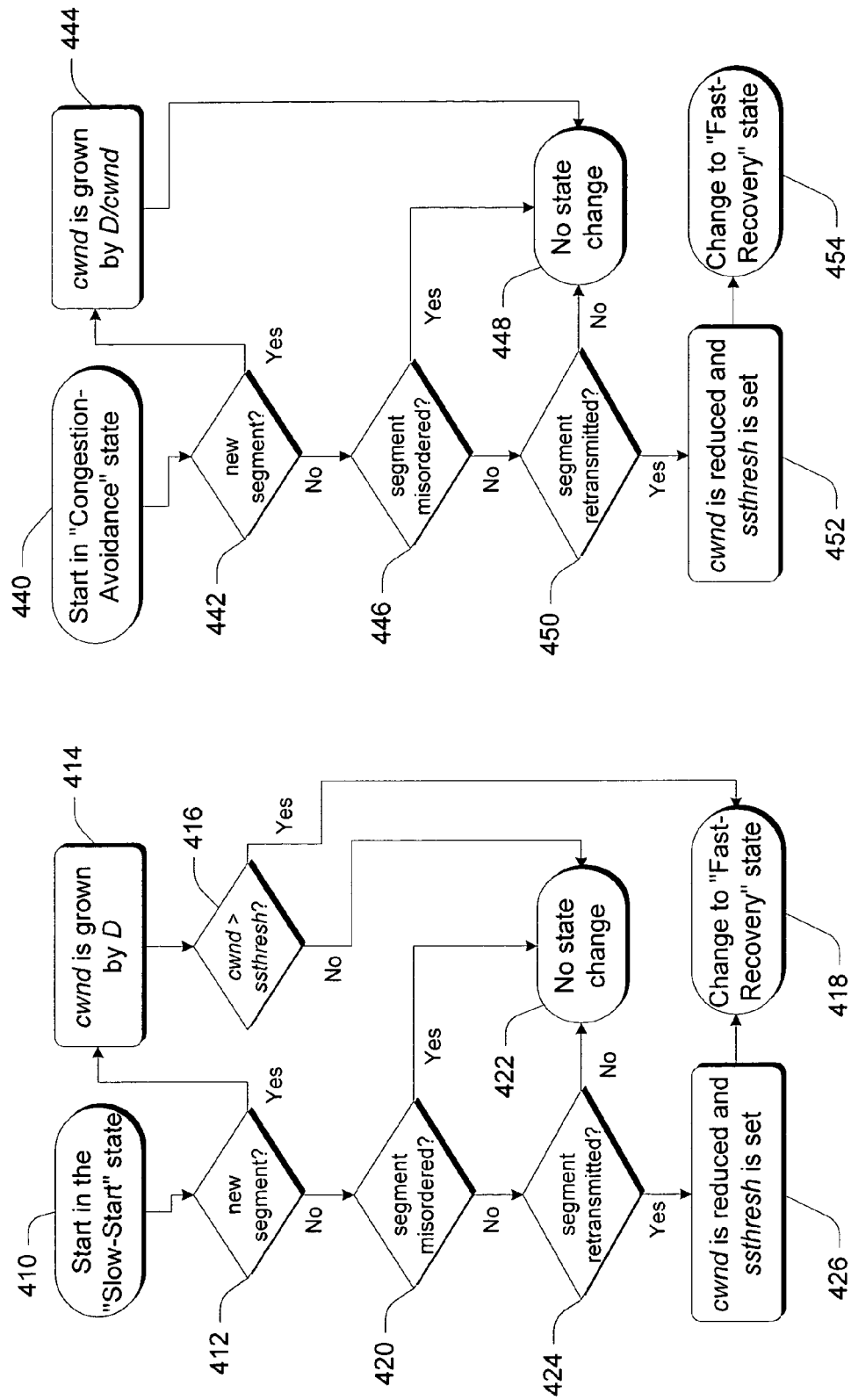
Figures 4C, 5A:
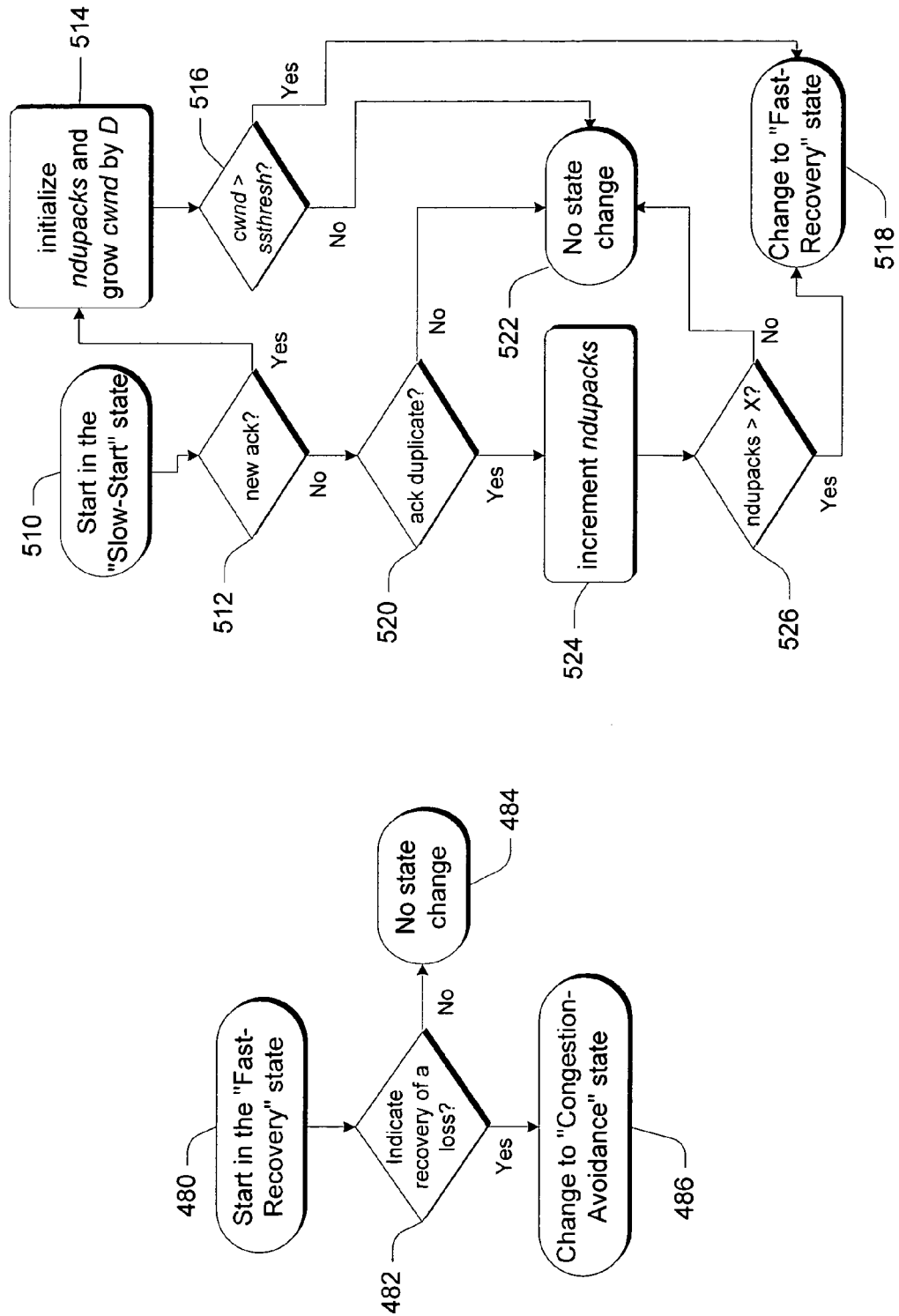

FIGS. 4A-4C show methodological implementations of this approach of the exemplary RLS-HCT technique performed within the RLS-HCT topology 150 (or some portion thereof). This methodological implementation may be performed in software, hardware, or a combination thereof.

FIG. 4A is a flowchart illustrating the decisions involved in state changes when starting in the "Slow-Start" state 310 of FIG. 3. Accordingly, at 410, start in the Slow-Start state.

At 412 of FIG. 4A, determine if there is a new segment. If so, cwnd is grown by D at 414, where D refers to the distance between the new segment and the latest received segment. After block 414, it is determined whether cwnd is greater than ssthresh at 416. If it is, then, at 418, the state changes to Fast-Recovery 330 of FIG. 3. If not, then no state change at 422.

If, at block 412 of FIG. 4A, it is determined that there is no new segment, then, at 420, it is determined whether the segment is misordered. If so, then the segment is ignored at 422. If not, then, at 424, it is determined whether the segment is retransmitted. If so, then, at 426, the cwnd is reduced (e.g., halved) and ssthresh is set (e.g., to max(cwnd, 2*MSS), where MSS is Maximum Segment Size). Also, the state changes, at 418, to Fast-Recovery 330 of FIG. 3. Otherwise, there is no state change at 422.

FIG. 4B is a flowchart illustrating the decisions involved in state changes when starting in the "Congestion-Avoidance" state 320 of FIG. 3. Accordingly, at 440, start in the Congestion-Avoidance state.

At 442 of FIG. 4B, determine if there is a new segment. If so, cwnd is grown by D/cwnd at 444. Otherwise, it is determined, at 446, whether the segment is misordered. If so, then the segment is ignored at 448. If not, then, at 450, it is determined whether the segment is retransmitted. If so, then, at 452, the cwnd is reduced (e.g., halved) and ssthresh is set (e.g., to max(cwnd, 2*MSS)). Also, the state changes, at 454, to Fast-Recovery 330 of FIG. 3. Otherwise, there is no state change at 448.

FIG. 4C is a flowchart illustrating the decisions involved in state changes when starting in the "Fast-Recovery" state 330 of FIG. 3. Accordingly, at 480, start in the Fast-Recovery state.

At 482 of FIG. 4C, it is determined if the new segment indicates a "recovery of a loss" state. If so, then, at 484, the state changes to Congestion-Avoidance 320 of FIG. 3. Otherwise, there is no state change at 484.

For the methodological implementation described above in relation to FIGS. 4A-4C, the judgment of misordering segment depends on the network conditions. For a network with moderate misordering, all segments in where PD within a given range is treated as misordering packets. For example, if the moderate misordering is 2-3 packets, then all segments in −3≦PD≦−1 are treated as misordering packets.

Since TCP variants differ from each other in Fast-Recovery period, this approach assumes the best case (i.e., after receiving new segments), the loss is recovered, and all retransmission segments are ignored unless there is a retransmission in a new window.

Approach B: Tracking Based on Acknowledgment

FIG. 3 depicts the states of this approach and the transitions between these states. It performs the nearly unmodified TCP congestion control algorithms for each acknowledgment number. In this approach, ndupacks tracks the number of duplicate acknowledgements.

FIGS. 5A-5C shows methodological implementations of this approach of the exemplary RLS-HCT technique performed within the RLS-HCT topology 150 (or some portion thereof). This methodological implementation may be performed in software, hardware, or a combination thereof.

FIG. 5A is a flowchart illustrating the decisions involved in state changes when starting in the "Slow-Start" state 310 of FIG. 3. Accordingly, at 510, start in the Slow-Start state.

At 512 of FIG. 5A, determine if there is a new acknowledgement. If so, then, at 514, ndupacks is initialized (e.g., setting it to zero) and cwnd is grown by D, where D refers to the distance between the new acknowledgement and the latest received acknowledgement. After block 514, it is determined whether cwnd is greater than ssthresh at 516. If it is, then, at 518, the state changes to Fast-Recovery 330 of FIG. 3. If not, then no state change at 522.

If, at block 512 of FIG. 5A, it is determined that there is no new acknowledgement, then, at 520, it is determined whether the acknowledgement is duplicate. If not, then no state change at 522. If so, then ndupacks is incremented at 524. It is determined whether there have been a given number X (e.g., three) or more of duplicate acknowledgments at 526. If it is, then, at 518, the state changes to Fast-Recovery 330 of FIG. 3. If not, then no state change at 522.

FIG. 5B is a flowchart illustrating the decisions involved in state changes when starting in the "Congestion-Avoidance" state 320 of FIG. 3. Accordingly, at 540, start in the Congestion-Avoidance state.

At 542 of FIG. 5B, determine if there is a new acknowledgment. If so, then at 544, ndupacks is initialized (e.g., setting it to zero) and cwnd is grown by D/cwnd. Otherwise, it is determined, at 546, whether the acknowledgment is duplicate. If not, then no state change at 554.

If so, then ndupacks is incremented at 548. It is determined whether there have been a given number (e.g., three) or more of duplicate acknowledgments at 550. If it is, then, at 552, the state changes to Fast-Recovery 330 of FIG. 3. If not, then no state change at 554.

FIG. 5C is a flowchart illustrating the decisions involved in state changes when starting in the "Fast-Recovery" state 330 of FIG. 3. Accordingly, at 580, start in the Fast-Recovery state.

At 582 of FIG. 5C, it is determined if the new acknowledgment indicates a "recovery of a loss" state. If so, then, at 588, ndupacks is initialized (e.g., setting it to zero). The state changes, at 586, to Congestion-Avoidance 320 of FIG. 3. Otherwise, there is no state change at 584.

Behavior in Compressor and Decompressor

Figure 6:
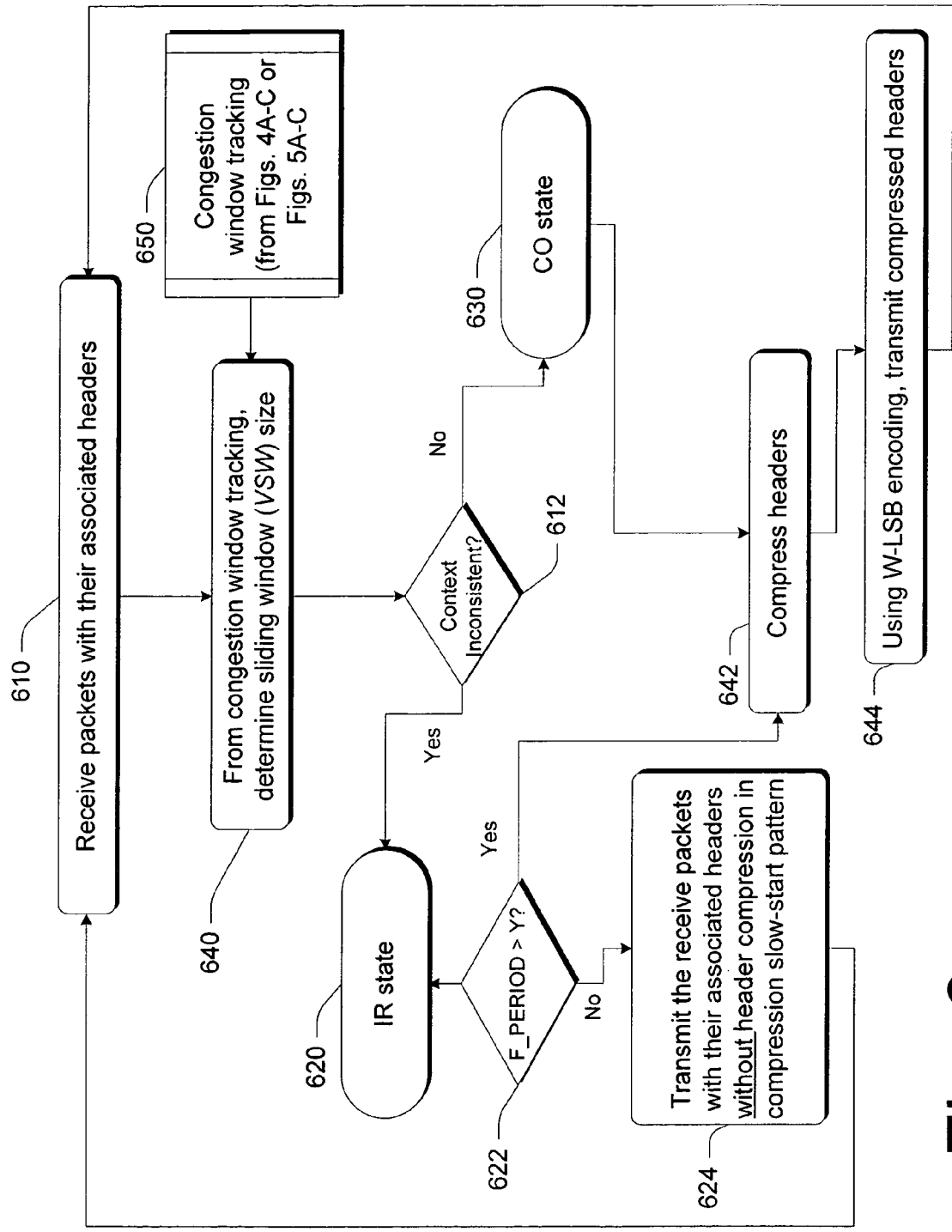
FIG. 6 is a flow diagram showing an example of a methodological implementation of the invention claimed herein.

FIG. 6 shows methodological implementation of the exemplary RLS-HCT technique performed within the RLS-HCT topology 150 (or some portion thereof). This methodological implementation may be performed in software, hardware, or a combination thereof.

By combining the above two mechanisms, W-LSB and TCP congestion window tracking, the exemplary RLS-HCT technique is developed to compress TCP/IP header efficiently and robustly. As shown in FIG. 2, the HC operates in two states, the Initialization and Refresh (IR) state and the COmpression (CO) state. In IR state, the exemplary RLS-HCT technique tries to refresh the HD's context to keep it consistent with the HC's context. In CO state, the HC only sends compressed headers to the HD to utilize the limited bandwidth efficiently.

Initially, the HC starts in IR start. When it gets enough confidence that the HD has established the context, it will move to CO state.

At 610 of FIG. 6, packets with their associated headers are received. At 640, the sliding window (VSW) is determined based upon the congestion window tracking process indicated by block 650 and illustrated in FIGS. 4A-C and FIGS. 5A-C.

At 612, it is determined whether there are indications that the HD may have inconsistent context with the HC (e.g., when the HC receives a segment with sequence number smaller than all the values in VSW). If so, the HC transits to the IR state 620. Of course, if it already is in the IR state, it stays there. If not, the HC transits to the CO state 630. Of course, if it already is in the CO state, it stays there.

From the CO state transition, the process proceeds to block 642, discussed below. From the IR state transition, the process proceeds to block 622, discussed below.

In IR state, the compression slow-start is used to ensure that the context is refreshed at the HD side. Whether or not to compress a receiving segment depends on F_PERIOD, the number of compressed segments transmitted between two full header packets. At 622, it is determined whether the F_PERIOD is greater than a given number Y, where Y is one window of packets have been sent to the HD.

Since F_PERIOD should be the power of two, after its reaching to $2^n$, the HC must have sent $1+2^0+1+2^1+1+2^2+\ldots+1+2^{n-1}=2^n+n-1$ packets. Once the F_PERIOD gets equal or larger than the estimated congestion window ($2^n \geq$ cwnd), it implies that there must be more than one window of packets have been sent to the HD ($2^n+n-1>$cwnd). Then the HC can deduce that the HD's context has been updated successfully.

If F_PERIOD is not greater than Y, then the packets with uncompressed headers are transmitted to HD at 624. If F_PERIOD is greater than Y, then process proceeds to block 642.

At 642, the headers are losslessly compressed. For more information on losslessly compressing headers see M. Degermark, M. Engan, B. Nordgren, and Stephen Pink, "Low-loss TCP/IP header compression for wireless networks", *In the Proceedings of MobiCom*, 1996. At 642, using W-LSB encoding, the compressed headers are transmitted to the HD.

In both IR and CO states, after transmitting any type of packet, the HC should add the packet header into VSW as a potential reference. After that, the HC invokes the TCP congestion window tracking approach A (sequence numbers) and B (acknowledgements) to get cwndA, ssthreshA, cwndB, and ssthreshB, respectively.

If the size of VSW is larger than k×max(max(cwndA, 2×ssthreshA), max(cwndB, 2×ssthreshB)), the VSW should be shrunk to make its size no larger than the above equation.

The sender may send new segments after retransmission in TCP's Fast-Recovery algorithm. It is hard to decide which packet has been received from the information at the HC side only. Thus, the VSW must be large enough before being shrunk. From the simulation results, k=2 is good on bandwidth-limited links, and k=4 is highly robust, but slightly inefficient.

Once receiving uncompressed TCP/IP header, the HD will use it as the reference packet for consecutive packets. If it receives the compressed TCP/IP header, the HD will decompress the packet and calculate the TCP checksum to check whether the decompression is correct or not. If the decompression succeeds, the HD may also use it as a reference value.

Exemplary Computing System and Environment

FIG. 7 illustrates an example of a suitable computing environment 900 within which an exemplary RLS-HCT technique, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary RLS-HCT technique may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary RLS-HCT technique may be described in the general context of computer-executable instructions, such as program modules, being executed by a computer. Generally, program modules include routines, programs, objects, components, data structures, etc. that perform particular tasks or implement particular abstract data types. The exemplary RLS-HCT technique may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 7 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of sender, header compressor (HC), receiver, header decompressor (HD), transmitter, and inferential synchronizer.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary RLS-HCT technique may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 900 in which an exemplary RLS-HCT technique may be implemented. Specifically, the exemplary RLS-HCT technique(s) described herein may be implemented (wholly or in part) by any program modules 928-930 and/or operating system 926 in FIG. 7 or a portion thereof.

The operating environment is only an example of a suitable operating environment and is not intended to suggest any limitation as to the scope or use of functionality of the exemplary RLS-HCT technique(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary RLS-HCT technique may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for efficient transmission of network transport-layer protocol headers via a communications link, the method comprising:

obtaining—by a transmitter configured to facilitate efficient transmission of network transport-layer protocol headers via a communications link—transport-layer protocol packets having associated transport-layer protocol headers;

compressing—by the transmitter—the associated headers;

feedback-independently transmitting of a plurality of the compressed headers via the communications link, the transmitting comprising:

adjusting a sliding window within which the plurality of the compressed headers are transmitted, wherein the adjusting is modeled to react to network window-size changes that results from the congestion procedures of the communications link;

using the sliding window, encoding the plurality of the compressed headers; and sending the resulting encoded plurality of compressed headers.

2. A method as recited in claim 1 further comprising inferentially determining whether there is an inconsistent context, wherein an inconsistent context is when one or more headers are not properly received by a receiver on the communications link.

3. A method as recited in claim 1 further comprising:

inferentially determining whether there is an inconsistent context, wherein an inconsistent context is when one or more headers are not properly received by a receiver on the communications link;

if so, then refreshing the context to make the context consistent.

4. A method as recited in claim 1, wherein, for the compressing, the headers are compressed losslessly.

5. A method as recited in claim 1, wherein the communications link is wireless.

6. A method as recited in claim 1, wherein the network transport-layer protocol is TCP.

7. A computer comprising one or more computer-readable storage media having computer-executable instructions that, when executed by the computer, perform the method as recited in claim 1.

8. A computer network comprising a computer comprising one or more computer-readable storage media having computer-executable instructions that, when executed by the computer, perform the method as recited in claim 1.

9. A computer-readable medium having computer-executable instructions that, when executed by a computer, performs the method as recited in claim 1.

10. A system for efficient transmission of network transport-layer protocol headers via a communications link, the system comprising:

a memory comprising a set of computer program instructions; and a processor coupled to the memory, the processor being configured to execute the computer program instructions, which comprise:

obtaining transport-layer protocol packets having associated transport-layer protocol headers;

compressing the associated headers;

feedback-independently transmitting of a plurality of the compressed headers via the communications link, the transmitting comprising:

adjusting a sliding window within which the plurality of the compressed headers are transmitted, wherein the adjusting is modeled to react to network window-size changes that results from the congestion procedures of the communications link.

11. A system as recited in claim 10, wherein the processor is further configured to execute the computer program instructions, which comprises inferentially determining whether there is an inconsistent context, wherein an inconsistent context is when one or more headers are not properly received by a receiver on the communications link.

* * * * *